United States Patent
Gupta et al.

(10) Patent No.: US 10,467,131 B1
(45) Date of Patent: Nov. 5, 2019

(54) METHOD AND SYSTEM FOR PERFORMANCE ANALYSIS BY TEST AUTOMATION FRAMEWORKS

(71) Applicant: EMC Corporation, Hopkinton, MA (US)

(72) Inventors: Rajendra Kumar Gupta, Bangalore (IN); Anupam Sharma, Bangalore (IN); Sanjeev Kumar Lohchab, Bangalore (IN); Naveen Kumar Surendra Rao, Bangalore (IN); Swapnadeep Deb Kanunjna, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 14/041,893

(22) Filed: Sep. 30, 2013

(51) Int. Cl.
*G06F 11/36* (2006.01)

(52) U.S. Cl.
CPC .................. *G06F 11/3688* (2013.01)

(58) Field of Classification Search
CPC ............. G06F 11/366; G06F 11/3452; G06F 11/3455; G06F 11/3604; G06F 11/3612; G06F 11/3692; G06F 2201/88
USPC ........................................................ 717/131
See application file for complete search history.

(56) References Cited

U.S. PATENT DOCUMENTS

| | | | |
|---|---|---|---|
| 6,205,413 B1 * | 3/2001 | Bisdikian ............ | H04L 41/5067 703/23 |
| 7,441,234 B2 * | 10/2008 | Cwalina et al. ............. | 717/128 |
| 7,614,046 B2 * | 11/2009 | Daniels et al. ............... | 717/170 |
| 8,117,598 B2 * | 2/2012 | Johnson et al. ............. | 717/124 |
| 8,756,586 B2 * | 6/2014 | Khanapurkar et al. ....... | 717/130 |
| 2004/0078185 A1 * | 4/2004 | Briggs ................ | G06F 11/3485 703/24 |
| 2005/0160411 A1 * | 7/2005 | Sangal et al. ................. | 717/144 |
| 2006/0048101 A1 * | 3/2006 | Krassovsky et al. ......... | 717/127 |
| 2007/0136024 A1 * | 6/2007 | Moser ................. | G06F 11/3688 702/119 |
| 2012/0222017 A1 * | 8/2012 | Hinkle et al. ................. | 717/130 |
| 2012/0266074 A1 * | 10/2012 | Bhoovaraghavan et al. ............... | 715/738 |
| 2012/0266143 A1 * | 10/2012 | Bhoovaraghavan et al. ............... | 717/127 |
| 2015/0220426 A1 * | 8/2015 | Spektor ................... | G06F 11/36 717/131 |

OTHER PUBLICATIONS

Cook et al., "Application and Program Performance Analysis Using PEX Statistics on IBM i5/OS", IBM, Jul. 2007, 276pg.*
Lehr et al., "Fast and Automatic Identification of Performance Outliners in Trace Data", IPCOM000114929D, Feb. 1995, 3pg.*

(Continued)

*Primary Examiner* — Ryan D. Coyer
(74) *Attorney, Agent, or Firm* — Dergosits & Noah LLP; Todd A. Noah (57) ABSTRACT

Performance analysis for test automation frameworks is described. A test is executed of an application. Performance indicators are logged during execution of the test, wherein the performance indicators include a first performance indicator. A correlation is identified between the first performance indicator and a second performance indicator recorded during the execution of the test or an execution of a previous test of the application. An output device outputs the correlation as a performance issue.

15 Claims, 3 Drawing Sheets

(56) References Cited

OTHER PUBLICATIONS

Jin et al., "Understanding and Detecting Real-World Performance Bugs", ACM, 2012, 11pg. (Year: 2012).*
Kim et al., "Classifying Software Changes: Clean or Buggy?", IEEE, 2008, 16pg. (Year: 2008).*

* cited by examiner

METHOD AND SYSTEM FOR PERFORMANCE ANALYSIS BY TEST AUTOMATION FRAMEWORKS

BACKGROUND

Test automation is the use of software to control the execution of tests, the comparison of actual outcomes to predicted outcomes, the setting up of test preconditions, and other test control and test reporting functions. A test automation framework is not a single tool to perform some specific testing task, but a set of tools that provide support for automated software testing in a unified manner, thereby providing a common platform for an automation engineer to do a job. If there is change to any test case for an application that is being tested, only the test case file needs to be updated, such that the driver script and startup script remain the same. The test automation framework integrates the function libraries, test data sources, object details and various reusable modules. The test automation framework is responsible for defining the format in which to express expectations, creating a mechanism to drive the application being tested, executing the tests, and reporting the results. Typically a test automation framework resides on a host computer and includes a script parser, a script execution engine, and a logger that logs and reports the test results. When test automation frameworks have to directly or indirectly interface with different third party applications, different environment configurations may be required for the testing of these applications. For example, a test automation framework is configured for three different operating systems if an application to be tested can be executed by the three different operating systems.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

An application program's development lifecycle typically requires various performance tests which involve evaluating whether or not various performance indicators of an application build satisfy application performance requirements. Performance tests typically provided little to no analysis for application program developers. For example, an early build of an application program passes a performance test if the central processing unit utilization of a remote client meets its corresponding performance requirement and the transfer rate of data to a storage node meets its corresponding performance requirement, while the early build of the application program fails the performance test if either performance requirement is not met. Informed that an early build of an application program passed a performance test, an application program developer has no other insight to identify performance issues that may not be identified until the end of the application's development cycle, which at that late time might adversely affect the release schedule.

Embodiments herein provide performance analysis by test automation frameworks. A test is executed of an application. For example, an execution engine executes a test of build two of a backup application release 2.0. Performance indicators are logged during execution of the test, wherein the performance indicators include a first performance indicator. For example, a logger logs the central processing unit utilization of a remote client and the transfer rate of data to a storage node during execution of the build two of the backup application release 2.0. A correlation is identified between the first performance indicator and a second performance indicator recorded during the execution of the test of the application or an execution of a previous test of the application. For example, a performance analyzer identifies an unusually high correlation between the central processing unit utilization of the remote client and the transfer rate of data to the storage node. An output device outputs the correlation as a performance issue. For example, the logger outputs the unusually high correlation as a performance issue for the build two of the backup application release 2.0, even though the central processing unit utilization of the remote client met its corresponding performance requirement and the transfer rate of data to the storage node met its corresponding performance requirement. This performance analysis helps in identifying performance issues much earlier in the application development cycle, reducing the risk to the release schedule.

Figure 1:
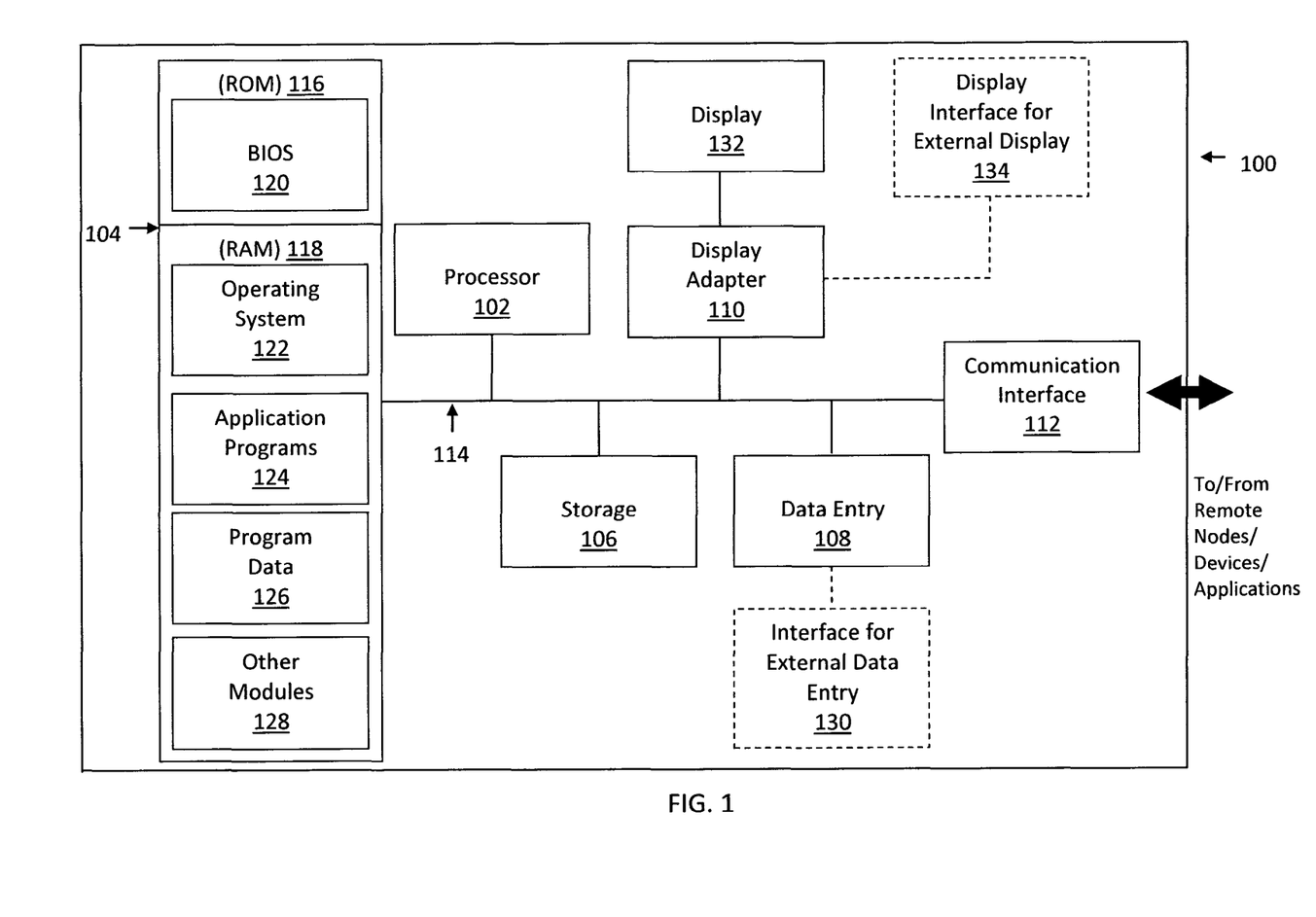
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for performance analysis by test automation frameworks.

Prior art performance tests typically provided little to no analysis for application program developers. Embodiments herein provide performance analysis by test automation frameworks. This performance analysis helps in identifying performance issues much earlier in the application development cycle, reducing the risk to the release schedule.

Figure 2:
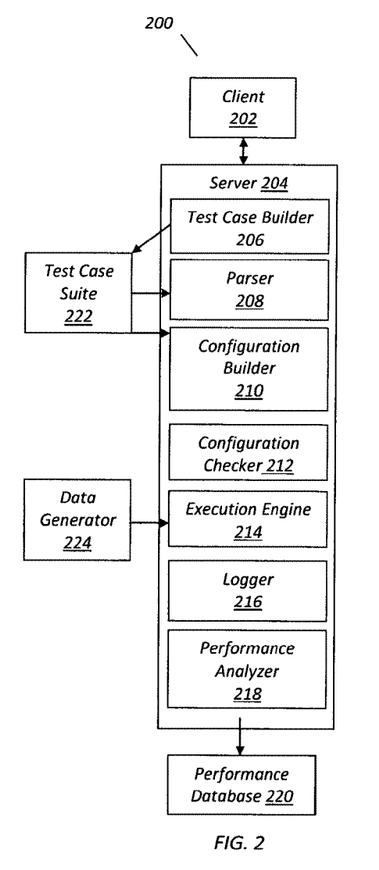
FIG. 2 illustrates a block diagram of an example system for performance analysis by test automation frameworks, under an embodiment.

FIG. 2 illustrates a block diagram of a system that implements performance analysis by test automation frameworks, under an embodiment. The test automation framework may be portable, such that it can test applications in many different environments. The test automation framework is scalable, such that the test automation framework may test an application on anywhere from one computer to thousands of computers. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of data for different client users.

In an embodiment, the system 200 represents a cloud computing system that includes a client 202, and a server 204 that is provided by a hosting company. Although FIG. 2 depicts the system 200 with one client 202 and one server 204, the system 200 may include any number of clients 202 and any number of servers 204. Each of the client 202 and the server 204 is substantially similar to the system 100 depicted in FIG. 1. The client 202 enables a user to communicate with the server 204, which functions as a test automation framework by executing a test case builder 206, a parser 208, a configuration builder 210, a configuration checker 212, an execution engine 214, a logger 216, and a performance analyzer 218.

The test case builder 206 receives user input that specifies configuration options, where the configuration options include server platform options, storage node platform options, device options, and savegroup options. The configuration options selected by the user are stored in a configuration file that is easily accessible and modifiable by the user. For example, a user inputs, via the client 202, configuration options into a configuration file, specifying two server platform options (Windows®, Linux®), two storage node platform options (Windows®, Linux®, and Solaris®), two device options (an advanced file type device, and a data domain boost device), and three savegroup options (Low Density Filesystem, Medium Density Filesystem, and High Density Filesystem). The test case builder 206 has the capability to include or exclude a particular combination of configuration options selected for exclusion or inclusion by the user.

The test case builder 206 populates a test case suite 222 based on combinations of configuration options. For example, the execution driver 206 executes a framework driver script which receives the configuration options from a framework trigger script that receives the configuration options from user input, and populates the test case suite 222 with thirty six instances of a single test case, in which the thirty six instances correspond to each combination of two server platform options multiplied by two storage node platform options multiplied by two device options multiplied by three savegroup options, as specified by a user.

A user of the system 200 may use a command line interface, which is a text-only interface, to initiate the configurable automation framework via the client 202. A command line interface may be used whenever a large vocabulary of commands or queries, coupled with a wide range of options, can be entered more rapidly as text than can be entered with a pure graphic user interface (GUI).

The parser 208 retrieves a test case that corresponds to the user-selected combination of configuration options from the test case suite 222, and parses the test case to identify script instructions to test an application for each combination of configuration options. For example, the parser 208 parses a test case from the test case suite 222 to identify script instructions to test an application for each of the thirty six combinations of server/storage node/device/savegroup configuration options. The test case suite 222 includes lists of test cases to be executed. The test cases include parameterization scripts that provide parameters to the test script to be executed to test an application, enabling the script for a single test case to be used to test the application for each of the configuration options. The parameterization scripts may be used to specify some options which either perform or skip specific operations for a particular script. The test case suite 222 stores the list of configuration options, predefined and customized for any particular application's continuous performance testing.

The configuration builder 210 builds configured environments based on user input that specifies configuration options, which is stored in the test case suite 222. For example, the configuration builder engine 210 builds an environment based on a Windows® server platform, a Windows® storage node, an advanced file type device, and a Low Density Filesystem savegroup.

The configuration checker 212 determines whether the server 204 is setup for each combination of configuration options. For example, the configuration checker 212 determines that the server 204 is setup for all thirty six server/storage node/device/savegroup combinations.

The execution engine 214 executes the script instructions to test the application for each combination of configuration options if the configuration checker 212 determines that the computer is setup for each combination of configuration options. For example, the execution engine 214 executes the script instructions to test the application for each of the thirty six server/storage node/device/savegroup combinations because the configuration checker 212 determines that the computer is setup for each of the thirty six server/storage node/device/savegroup combinations.

The execution engine 214 may execute a sample test with minimal simulation to ensure that all the components are ready for the main test before the execution engine 214 executes the main test. If the sample test fails, the configuration builder 210 may rebuild the configured environment, and the execution engine 214 may retry the sample test.

The execution engine 214 includes a test iterator that traverses through all of the applicable instances and applies the same business logic to all of the combinations of configurations. For example, if a user selected three iterations for each combination of two server platform options, two storage node platform options, two device options, and three savegroup options, the test iterator would traverse through 108 instances (three iterations multiplied by two server platform options multiplied by two storage node platform options multiplied by two device options multiplied by three savegroup options) for the same test case. Executing multiple iterations with the same configuration options may provide averaged resource utilizations to a requesting user.

The execution engine 214 may use data from the data generator 224 to execute a script instruction. The data generator 224 may be a file system data generator, a SQL data generator, an exchange data generator, a Sharepoint data generator, and/or an Oracle data generator. For example, the execution engine 214 executes a test of build two of a backup application release 2.0 in an environment based on a Windows® server platform, a Windows® storage node, an advanced file type device, and a Low Density Filesystem savegroup. Although this example describes the execution engine 214 executing a test of a backup application, performance analysis by test automation frameworks may be applied to any type of application. The execution engine 214 enables continuous performance analysis throughout the application development lifecycle, as automated script triggers performance tests on every application release and every application build, thereby providing a continuous performance evaluation which spans across the complete application development lifecycle.

The logger 216 logs a result, including performance indicators, of executing the script instructions for each combination of configuration options. For example, the logger 216 logs the results, which may be stored in a performance database 220, which includes the central processing unit utilization of a remote client and the transfer rate of data to a storage node during execution of the build two of the backup application release 2.0. If a performance test requires one server and four clients, then resource monitoring scripts can run on each of these nodes and capture the resource utilization data.

The performance analyzer 218 identifies a correlation between a first performance indicator and a second performance indicator recorded during an execution of a test of an application or an execution of a previous test of the application. For example, the performance analyzer 218 identifies an unusually high correlation between the central processing unit utilization of a remote client and the transfer rate of data to a storage node. Although this example depicts the performance analyzer 218 identifying a correlation between two specific performance indicators that the logger 216 logged during execution of the same build and the same release of an application, the storing of performance indicators in the performance database 220 enables the performance analyzer 218 to identify correlations between any performance indicators logged during the execution of different builds and/or different releases. For example, the performance analyzer 218 identifies an unusually high correlation between the central processing unit utilization of a remote client logged during the execution of build two of a backup application release 2.0 and the transfer rate of data to a storage node logged during the execution of build one of a backup application release 1.0. The performance database 220 helps in cross section analysis of different configurations, different releases, and/or different builds.

The logger 216 outputs the result, including a correlation as a performance issue, via an output device, such as the client 202. For example, the logger 216 outputs a report that includes the unusually high correlation as a performance issue for the build two of the backup application release 2.0, even though the central processing unit utilization of the remote client met its corresponding performance requirement and the transfer rate of data to the storage node met its corresponding performance requirement. A correlation between performance indicators from different builds may indicate a trend that assists the marketing team and the support team to suggest the configured environment which can deliver the best data throughput. The client 202 may output a single pane user interface for end users, which provides ease of custom reports based on application builds and application releases, as well as an in-depth comparison between various performance indicators across various phases of the development cycle.

A user may select a combination of configured environments, application builds, and application releases, and query for the combination's performance indicators and correlations. If a user selects a combination, the logger 216 may provide a performance trend for that particular release across the builds The performance analysis offers a panoramic view of application performance, such that any performance issue may be identified prior to the last phases of the application development cycle.

The reports and notifications may also enable precise identification of which combination of configurations failed to execute the application properly, which script instruction identified the failure, and when the failure occurred within the sequence of script instructions. If the execution of a particular script instruction failed, was unsupported, or did not run, the batch execution of the application testing does not stop because the server 204 may continue the processing of the next script instruction in the test case.

Figure 3:
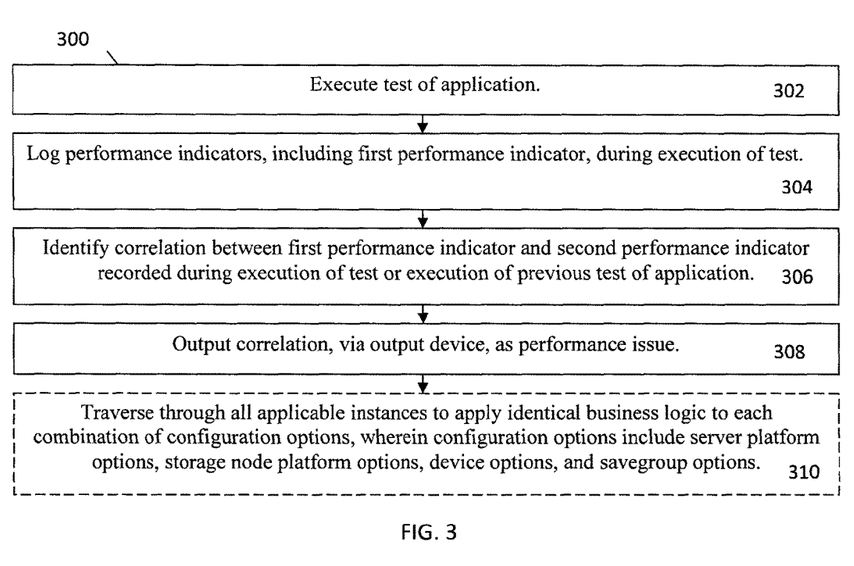
FIG. 3 is a flowchart that illustrates a method of performance analysis by test automation frameworks, under an embodiment.

FIG. 3 is a flowchart that illustrates a method for performance analysis by test automation frameworks. Flowchart 300 illustrates method acts illustrated as flowchart blocks for certain steps involved in and between the client 202 and the server 204 of FIG. 2.

A test is executed of an application, act 302. For example, the execution engine 214 executes a test of a build two of a backup application release 2.0.

Performance indicators, including a first performance indicator, are logged during execution of a test of an application, act 304. For example, the logger 216 logs the central processing unit utilization of a remote client and the transfer rate of data to a storage node during execution of the build two of the backup application release 2.0.

A correlation is identified between a first performance indicator and a second performance indicator recorded during an execution of a test of an application or an execution of a previous test of the application, act 306. For example, the performance analyzer 218 identifies an unusually high correlation between the central processing unit utilization of a remote client and the transfer rate of data to a storage node.

An output device outputs a correlation as a performance issue, act 308. For example, the logger 216 outputs the unusually high correlation as a performance issue for the build two of the backup application release 2.0, even though the central processing unit utilization of the remote client met its corresponding performance requirement and the transfer rate of data to the storage node met its corresponding performance requirement.

All applicable instances are optionally traversed to apply identical business logic to each combination of configuration options, wherein configuration options include server platform options, storage node platform options, device options, and savegroup options, act 310. For example, the execution engine 216 traverses through all applicable instances to apply identical business logic to each of the thirty six combinations of two server platform options multiplied by two storage node platform options multiplied by two device options multiplied by three savegroup options, as specified by a user.

The system 200 depicted in FIG. 2 may execute the acts 302-310 until all of the script instructions identified in the test case suite 222 depicted in FIG. 2 are executed to test the application. Although FIG. 3 depicts the acts 302-310 occurring in a specific order, the acts 302-310 may occur in another order. This performance analysis helps in identifying performance issues much earlier in the application development cycle, reducing the risk to the release schedule.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for a performance analysis, the system comprising:
    one or more processors; and
    a non-transitory computer readable medium storing a plurality of instructions, which when executed, cause the one or more processors to:
        receive a user input specifying configuration options for a testing environment, the configuration options comprising at least one of each of a server platform option, a storage node platform option, a device option, and a savegroup option;
        populate a test case suite based on combinations of the configuration options specified in the user input, the test case suite comprising a plurality of instances of a test case, each instance having a configuration based on the user input;
        execute, on all of the instances of the test case suite, a first plurality of tests of a first version of an application and a second plurality of tests of a second version of the application, the first version of the application being a first build of the application and the second version of the application being a second build of the application, the execution of the first plurality of tests generating a first test result and the execution of the second plurality of tests generating a second test result, the first test result and second test result including a plurality of performance indicators representing the performance of a plurality of system components in a test environment of the system during each test, each of the performance indicators associated with a performance requirement, and the plurality of performance indicators included in at least one of the two test results meeting the performance requirements;
        log the first test result and the second test result;
        identify a correlation between a first performance indicator in the first test result and a second performance indicator in the second test result, a system component of the plurality of system components represented by the first performance indicator being different than a system component of the plurality of system components represented by the second performance indicator; and
        output the correlation, via an output device, as a performance issue.

2. The system of claim 1, wherein the first plurality of tests of the application comprises previous tests of the first build of the application and the second plurality of tests of the application comprises tests of the second build of the application.

3. The system of claim 1, wherein the first plurality of tests of the application comprises previous tests of a first release of the application and the second plurality of tests of the application comprises tests of a second release of the application.

4. The system of claim 1, wherein the first performance indicator of the plurality of performance indicators meets a corresponding performance requirement.

5. A computer-implemented method for performance analysis, the method comprising:
    receiving a user input specifying configuration options for a testing environment, the configuration options comprising at least one of each of a server platform option, a storage node platform option, a device option, and a savegroup option;

populating a test case suite based on combinations of the configuration options specified in the user input, the test case suite comprising a plurality of instances of a test case, each instance having a configuration based on the user input;

executing, on all of the instances of the test case suite, a first plurality of tests of a first version of an application and a second plurality of tests of a second version of the application, the first version of the application being a first build of the application and the second version of the application being a second build of the application the application, the execution of the first plurality of tests generating a first test result and the execution of the second plurality of tests generating a second test result, the first test result and second test result including a plurality of performance indicators representing the performance of a plurality of system components in a test environment of the system during each test, each of the performance indicators associated with a performance requirement, and each of the plurality of performance indicators included in at least one of the two test results meeting the performance requirements;

logging the first test result and the second test result;

identifying a correlation between a first performance indicator in the first test result and a second performance indicator in the second test result, a system component of the plurality of system components represented by the first performance indicator being different than a system component of the plurality of system components represented by the second performance indicator; and outputting the correlation, via an output device, as a performance issue.

6. The method of claim 5, wherein the first plurality of tests of the application comprises previous tests of the first build of the application and the second plurality of tests of the application comprises tests of the second build of the application.

7. The method of claim 1, wherein the first plurality of tests of the application comprises previous tests of a first release of the application and the second plurality of tests of the application comprises tests of a second release of the application.

8. The method of claim 5, wherein the first performance indicator of the plurality of performance indicators meets a corresponding performance requirement.

9. A computer program product, comprising a computer-readable program code to be executed by one or more processors when retrieved from a non-transitory computer readable medium, the program code including instructions to:

receive a user input specifying configuration options for a testing environment, the configuration options comprising at least one of each of a server platform option, a storage node platform option, a device option, and a savegroup option;

populate a test case suite based on combinations of the configuration options specified in the user input, the test case suite comprising a plurality of instances of a test case, each instance having a configuration based on the user input;

execute, on all of the instances of the test case suite, a first plurality of tests of a first version of an application and a second plurality of tests of a second version of the application, the first version of the application being a first build of the application and the second version of the application being a second build of the application, the execution of the first plurality of tests generating a first test result and the execution of the second plurality of tests generating a second test result, the first test result and second test result including a plurality of performance indicators representing the performance of a plurality of system components in a test environment of the system during each test, each of the performance indicators associated with a performance requirement, and each of the plurality of performance indicators included in at least one of the two test results meeting the performance requirements;

log the first test result and the second test result;

identify a correlation a first performance indicator in the first test result and a second performance indicator in the second test result, a system component of the plurality of system components represented by the first performance indicator being different than a system component of the plurality of system components represented by the second performance indicator; and output the correlation, via an output device, as a performance issue.

10. The computer program product of claim 9, wherein the first plurality of tests of the application comprises a previous test of the first build of the application and the second plurality of tests of the application comprises a test of the second build of the application.

11. The computer program product of claim 9, wherein the first plurality of tests of the application comprises a previous test of a first release of the application and the second plurality of tests of the application comprises a test of a second release of the application.

12. The computer program product of claim 9, wherein the first performance indicator of the plurality of performance indicators meets a corresponding performance requirement.

13. The system of claim 1, where the first and second performance indicators are different indicators of resource utilization selected from a set consisting of a memory utilization, a central processing unit utilization, an input/output throughput, and a network bandwidth utilization.

14. The method of claim 5, where the first and second performance indicators are different indicators of resource utilization selected from a set consisting of a memory utilization, a central processing unit utilization, an input/output throughput, and a network bandwidth utilization.

15. The computer program product of claim 9, where the first and second performance indicators are different indicators of resource utilization selected from a set consisting of a memory utilization, a central processing unit utilization, an input/output throughput, and a network bandwidth utilization.

* * * * *